United States Patent Office 3,546,447
Patented Dec. 8, 1970

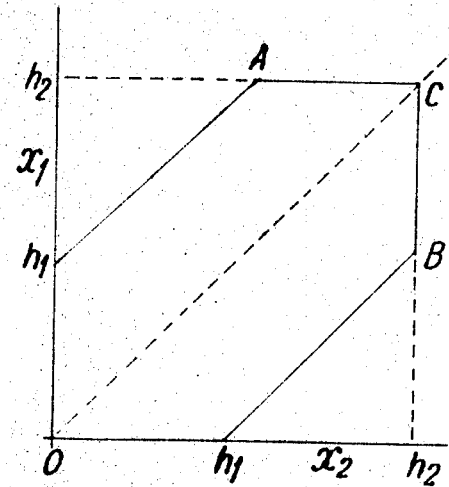
PRIOR ART Fig. 1.
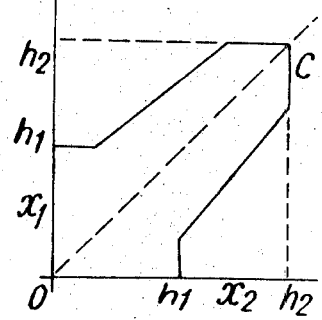
Fig. 3.
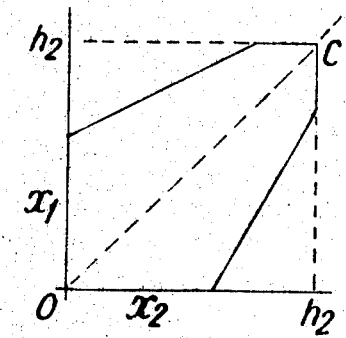
Fig. 4.
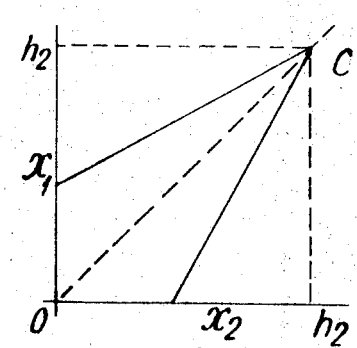
Fig. 5.

3,546,447
DETECTION OF OVERHEATED AXLE BOXES
Lionel Raymond Frank Thompson, Hatfield, and Leslie Bullock, Ware, England, assignors to Hawker Siddeley Dynamics Limited, Hatfield, England, a British company
Filed June 3, 1968, Ser. No. 734,149
Claims priority, application Great Britain, June 8, 1967, 26,618/67
Int. Cl. B61k 9/06; B61l 1/10
U.S. Cl. 246—169                                    3 Claims

ABSTRACT OF THE DISCLOSURE

In equipment for detecting hot axle boxes on running railroad rolling stock and locomotives, two detectors derive two separate signals representing the temperature levels of the two axle boxes at opposite ends of the same axle. Each of these signals is applied to a respective one of two threshold lever switches controlling respective alarm output channels. An alarm signal appears on the respective output if a temperature level signal exceeds a variable threshold level control signal applied in common to each threshold level switch. The derivation of the variable threshold level control switch is as follows: Each temperature level signal has the same preset fixed signal subtracted from it and then the two remaining portions of the temperature level signals are summed with one another, attenuated and then summed again with a further preset fixed signal. The signal resulting from this second summation is passed through a limiter, which prevents the signal passed from exceeding a third preset fixed value, and the limiter output is applied as the threshold level control signal.

---

Figure 2:
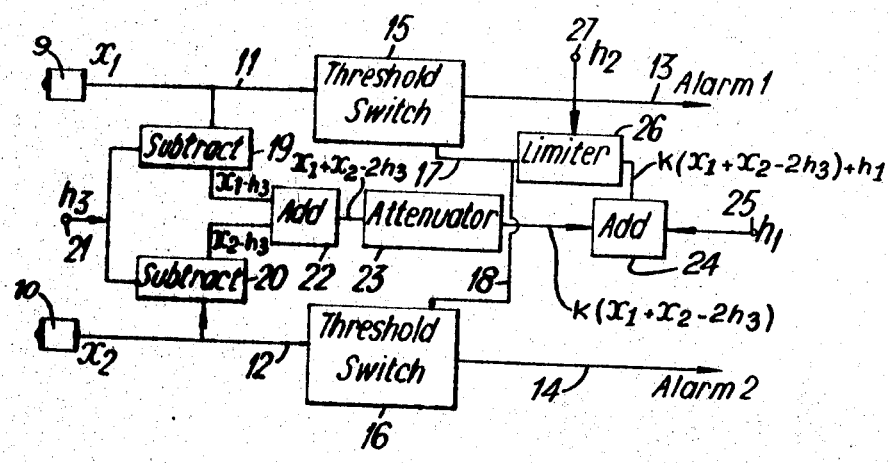

This invention relates to the detection of overheated axle boxes on railway locomotives and rolling stock.

Equipment is known for detecting hot axle boxes wherein detector units are mounted alongside a railway track each unit including an electrical component which responds to infrared radiation and is imaged by an appropriate optical system on to the axle boxes of passing trains. An acknowledged difficulty with such equipment is that journal bearings on trains vary in type and that which would constitute an overheated condition in one type is a normal running temperature in another type. For instance, roller bearings tend to have normal running temperature which would denote overheating in a plain bearing. As a consequence there is the problem of choosing a temperature threshold value above which the response of the infrared detector is to set up warning of the presence of an overheated box.

To meet this difficulty, and since the axle boxes on both sides of a train have to be monitored, it has been proposed to pair up detector units on opposite sides of the track and to compare the temperature signal received in respect of one axle box with that received simultaneously from the box at the opposite end of the same axle. Since both bearings on any one axle will be of the same type it has been suggested that simple subtraction of the two signals one from another will give a difference signal that will reliably indicate an overheated box when it exceeds a selected predetermined reference value. And an absolute upper limit is set such that a temperature value of either box in excess of that absolute limit sets off the alarm.

However, investigation of this scheme reveals that it too has important disadvantages. The graphical characteristic defining the boundaries of the region within which the temperature differential between the two bearings will not set off the alarm displays illogical discontinuities, one effect of which is to give rise to a tendency for those bearings which normally run hottest, e.g., locomotive roller bearings, to trigger the alarm even when they are still safely within their normal working temperature range. And no proper account is taken of the fact that a wider disparity between the bearing temperatures is permissible when the mean temperature of the bearings is lower.

It is therefore an object of this invention to put forward an improved novel treatment of the two temperature signals from two axle boxes of the same type.

According to the present invention, the threshold level which has to be exceeded by one or other of the two axle box temperature signals to produce an alarm is derived as a function of the sum of the two temperature levels detected from the two axle boxes and a constant preset value. More particularly, the signal levels from the two axle boxes are summed and a portion of the sum is added to a constant signal to determine the threshold level for two threshold switches one in each of two separate channels conveying the two axle box temperature signals.

In the preferred arrangement, an overall upper limit is applied to the threshold level so that it can never exceed a predetermined value. If desired, a fixed level may be subtracted from the temperature level of each axle box, the signals thus obtained then being summed, attenuated and added to the aforesaid constant preset value.

More specifically, the invention provides a system for detecting hot axle boxes on railway rolling stock, comprising two separate detectors for deriving two electrical signals representative of the temperature levels of the two axle boxes at opposite ends of the same axle of a passing car or wagon, means for summing at least respective portions of these two signals, means for attenuating the result of this summation and for adding a further electrical signal representing a constant preset value to derive a control signal, two alarm signal output channels each individual to a respective axle box temperature signal, and two threshold switches each having a respective axle box temperature signal applied to it and determining, in accordance with the value of said control signal, whether an alarm signal shall appear on the respective alarm output channel.

Whereas the discussion so far has assumed that the two temperature signals treated will be derived by detection of the radiation from the two axle boxes at opposite ends of the same axle, the same treatment could be accorded to the signals derived from any two axle boxes on any one car or wagon, whether on opposite sides or the same side, because all the bearings on an individual car or wagon will be of the same type.

The practice of the invention will now be discussed in more detail with reference to the accompanying drawings, one specific apparatus for carrying the invention into effect being described by way of example.

In the drawings:
FIG. 1 illustrates graphically the characteristic of operation of a prior system,
FIG. 2 is a block diagram of a system according to the invention, and
FIGS. 3 to 5 are graphical operating characteristics obtainable with the system of FIG. 2.

FIG. 1 of the drawings illustrates graphically the result achieved by the previous scheme involving simple comparison of the two temperature signals from opposite boxes on the same axle. The temperature level $x_1$ of one box is plotted against the temperature level $x_2$ of the other; the broken line at 45° denotes the normal working line with both boxes at the same temperature, and the two 45° parallel full lines having equal intercepts $h_1$ on the graph axes define the upper and lower boundaries of the region outside which the alarm is triggered. The working band between the two parallel full lines is terminated at the upper end by the absolute temperature limit $h_2$, which produces a lozenge-shaped region with illogical discontinuities at the points A and B. This shape tends to put into the alarm-triggering area outside the lozenge points beyond the apex C but lying close to the extension of the broken line OC which may well indicate locomotive bearings operating within their safe temperature range. On the other hand raising the limit $h_2$ to include these points will also include points closer to the projections of the full lines beyond A and B which points denote bearings in respect of which the temperature disparity is, at such a high mean temperature, beyond the permissible value so that the alarm ought to be triggered.

An apparatus to operate in accordance with the improved technique of this invention is illustrated in block diagram form in FIG. 2. Two temperature signals $x_1$ and $x_2$ are derived, respectively, from hot box detectors 9, 10 disposed one at either side of a railroad track for simultaneously scanning the two axle boxes at opposite ends of the same axle of a passing car or wagon. The two temperature signals $x_1$ and $x_2$ are handled in separate channels 11, 12 to give two separate alarm triggering outputs at 13 and 14. In each channel is a threshold switch or gate 15, 16 which is controlled by a threshold control level or gating signal along a control line 17, 18. The threshold level is not a fixed value according to the sum of the same axle of a passing car or wagon. The two temboxes as will now be described.

The levels of radiation detected from both axle boxes are summed and a portion of the sum is added to a constant value to determine the threshold level for both threshold switches. A limiter is incorporated such that, whatever the values of the levels of radiation detected, the level at which the threshold switch will operate never exceeds a predetermined value. In a further refinement, and this is the system illustrated, a fixed level is subtracted from the level detected from each axle box and the resultant levels summed and added to another fixed level to determine the threshold level of each threshold switch. Each temperature level signal is applied to a respective subtracting unit 19, 20 where it has subtracted from it the fixed signal level $h_3$ applied on terminal 21. The outputs from the two subtracting units are summed in an adding unit 22 and the output of the adding unit 22 is applied via an attenuator 23 to a further adding unit 24 where it is summed with a further fixed level signal $h_1$ applied on terminal 25. The output of the adding unit 24 is applied via a limiter 26 to the threshold control lines 17, 18, the limit value being set by a third fixed level signal $h_2$ applied to the limiter 26 on a terminal 27. While $h_1$, $h_2$ and $h_3$ are preset fixed levels they may, of course, be adjusted to change the operating characteristics of the system. The subtracting circuits 19, 20 are arranged so that if $x_1 - h_3$ or $x_2 - h_3$ is negative the output of the respective subtracting unit is held at zero.

FIGS. 3, 4 and 5 illustrate, for comparison with FIG. 1, typical characteristics of the system just described. It will be seen that the sloping full lines are now not parallel but converge toward the mid line OC. The effect of this is that the discontinuities A, B in the previous characteristic can be avoided and the temperature differential at which the alarm is set off decreases as the mean temperature increases. FIGS. 4 and 5 shows cases where the signal value $h_3$ is zero and the sloping full lines extend back to the graph axes. The slope of these lines can be varied by adjusting the attenuator to change the degree to which the summed temperature signals are attenuated before the signal value $h_1$ is added to them.

To explain more fully how the system operates, it will first be assumed that the signal value $h_3$ is zero. In that case, the adder 22 merely adds together the separate signals $x_1$ and $x_2$ to give an output representative of $x_1 + x_2$. If the attenuator 23 attenuates the signal it receives by a factor of $k$ less than 1, the output of the attenuator 23 will be representative of $k(x_1 + x_2)$. The adder 24 adds to this signal the value $h_1$ so that the signal applied by the adder 24 to the limiter 26 becomes $k(x_1 + x_2) + h_1$. Assuming that the value of this input signal to the limiter 26 from the adder 24 is less than $h_2$, the signal is applied unchanged to each of the threshold switches 15, 16; then either signal $x_1$ or signal $x_2$ will be passed to the respective alarm line 13 or 14 via the respective threshold switch 15 or 16 if the signal $x_1$ or $x_2$ exceeds the value of the common signal applied to the two threshold switches 15, 16 from the limiter 26 over the lines 17, 18. The threshold conditions are therefore represented by the two equations:

$$x_1 = k(x_1 + x_2) + h_1$$
$$x_2 = k(x_1 + x_2) + h_1$$

These reduce to two equations of the form:

$$x_1 = Ax_2 + B$$
$$x_2 = Ax_1 + B$$

Graphically, these equations are two straight lines symmetrical about the line OC in FIGS. 4 and 5 and with their slopes determined by the constant A which is equal to $$\frac{k}{1-k}$$

The constant B is equal to $$\frac{h_1}{1-k}$$

However, due to the presence of the limiter 26, if the signal applied to this limiter by the adder 24 should be in excess of the reference value $h_2$, the output of the limiter applied over lines 17 and 18 to the threshold switches 15 and 16 will be held at the constant value $h_2$ so long as the input from the adder 24 exceeds that value. Under these circumstances, the threshold conditions are represented by $x_1 = h_2$ and $x_2 = h_2$ so that a cut-off is obtained in respect of each graphical line at the level $h_2$ as shown in FIG. 4.

Considering now the effect of introducing the signal value $h_3$ subtracted from each of the input signals $x_1$, $x_2$, this does not alter the general form of the equations for $x_1$ and $x_2$ so long as the values $x_1 - h_3$ and $x_2 - h_3$ are positive. The only change is in the constant B which now becomes equal to $$\frac{h_1 - 2kh_3}{k - 1}$$

Thus the two graph lines for $x_1$ and $x_2$ are merely positionally displaced without alteration in their slope, since the constant A remains unaltered, and they are still symmetrically disposed about the line OC passing through the origin. However, if $x_1$ and $x_2$ fall to values less than $h_3$, making the values $x_1 - h_3$ and $x_2 - h_3$ negative, as has already been explained the signals applied by the subtraction units 19, 20 for summation by the adder 22 are each held constant at the value zero for so long as this condition persists. This means that the right hand side of the threshold equation for $x_1$ and $x_2$ reduces merely to the value $h_1$, which is a constant, giving lower limit cut-off lines at the values of $x_1$ and $x_2$ equal to $h_1$ as illustrated in FIG. 3.

It will be noted that in FIG. 5 the two full lines converge to a point inside the square defined by the value of the upper limit $h_2$. This condition can be brought about by adjustment of the attenuator and/or by increasing the signal level $h_2$, thus avoiding the aforementioned discontinuities. When this condition is the operative one the limiter 26 may be omitted from the system.

A versatile system is thus provided of which the response characteristics can be readily varied to suit particular circumstances. Especially is it possible to avoid undesired alarms in the case of locomotive axle bearings without disadvantageously reducing the possibility of detecting other axle boxes that are overheated.

We claim:

1. A system for detecting hot axle boxes on railway rolling stock, comprising two separate detectors for deriving two respective electrical signals representative, respectively, of the temperature levels of the two axle boxes at opposite ends of the same axle of a passing car or wagon, first summing means for summing at least respective portions of said two electrical signals, attenuating means for attenuating the results of this summation, second summing means for adding to the attenuated signal a further electrical signal representing a constant preset value to derive a control signal, two alarm signal output channels each individual to a respective axle box temperature signal, and two threshold switches each having a respective axle box temperature signal applied to it and determining, in accordance with the value of said control signal, whether an alarm signal shall appear on the respective alarm output channel.

2. A system according to claim 1, further comprising means for subtracting the same fixed preset signal from each of the axle box temperature signals before they are summed by said first summing means.

3. A system according to claim 1, further comprising a limiter receiving said control signal from said second summing means and applying its output as a variable threshold level signal to each of said threshold switches, a further preset signal value being applied to the limiter to determine the maximum output level thereof.

References Cited

UNITED STATES PATENTS

| 3,100,097 | 8/1963 | Waltersdorf | 246—169 |
| 3,108,772 | 10/1963 | Pelino | 246—169 |

FOREIGN PATENTS

| 1,131,254 | 6/1962 | Germany. |

ARTHUR L. LA POINT, Primary Examiner

G. H. LIBMAN, Assistant Examiner

U.S. Cl. X.R.

250—83.3